United States Patent
Genter et al.

[15] 3,636,446
[45] Jan. 18, 1972

[54] RECEIVER FOR DETECTING SIGNALS WITHIN A PREDETERMINED BANDWIDTH

[72] Inventors: Roland E. Genter, Falls Church, Va.; Raymond S. Connell, Jr., Adelphi, Md.

[73] Assignee: H. B. Engineering Corporation, Silver Springs, Md.

[22] Filed: Mar. 4, 1970

[21] Appl. No.: 16,418

[52] U.S. Cl. .............................. 324/78 F, 324/79 R, 328/138
[51] Int. Cl. ..................................... G01r 23/02, G01r 23/14
[58] Field of Search .................. 324/78 F, 79, 78 R; 328/134, 328/138

[56] References Cited

UNITED STATES PATENTS 3,307,408   3/1967   Thomas et al. ........................ 324/78 F

*Primary Examiner*—Alfred E. Smith
*Attorney*—Dike, Thompson & Bronstein

[57] ABSTRACT

A receiver for detecting the presence of a signal, said receiver including a first multiplier for multiplying together the signal to be detected and a signal at substantially the same frequency as the signal to be detected, a second multiplier for multiplying together the signal to be detected and a signal at substantially the same frequency as the signal to be detected, said signals provided to the second multiplier being separated by about 90° by phase-shifting means, low-pass filters coupled to the output of each of the multipliers and a detector for combining the signals from the filters and sensing if the combined level thereof is greater or equal to a predetermined level.

9 Claims, 4 Drawing Figures

PATENTED JAN 18 1972 3,636,446
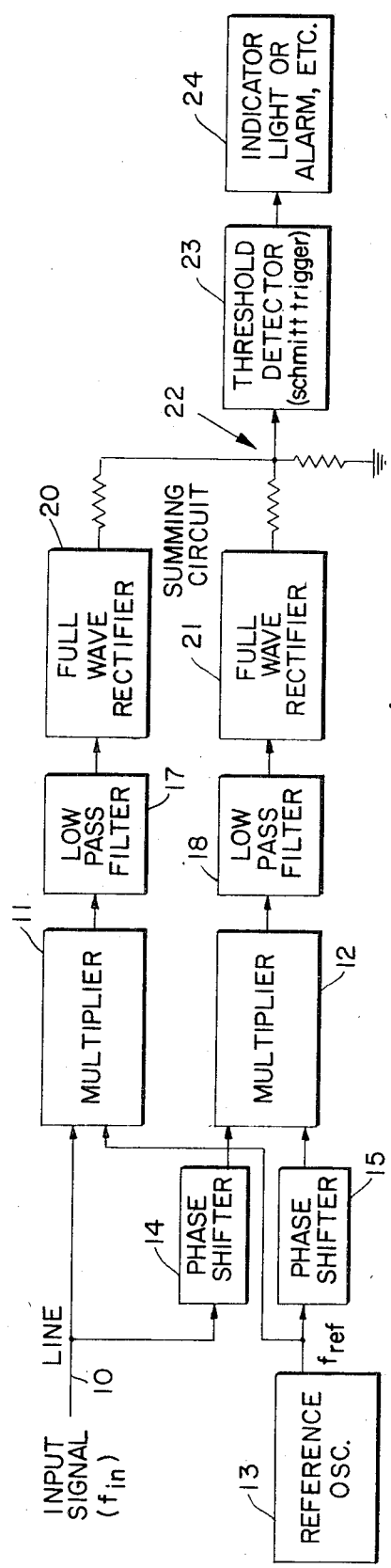
FIG. 1
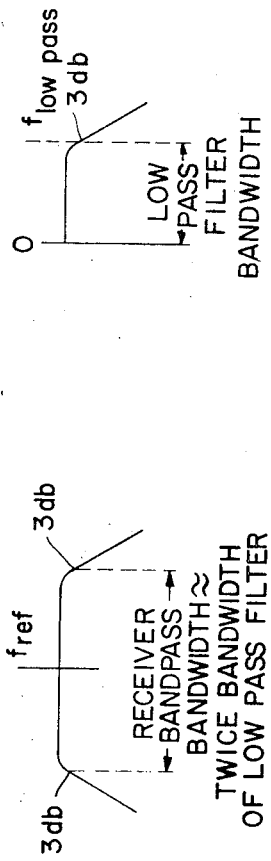
FIG. 2
FIG. 3
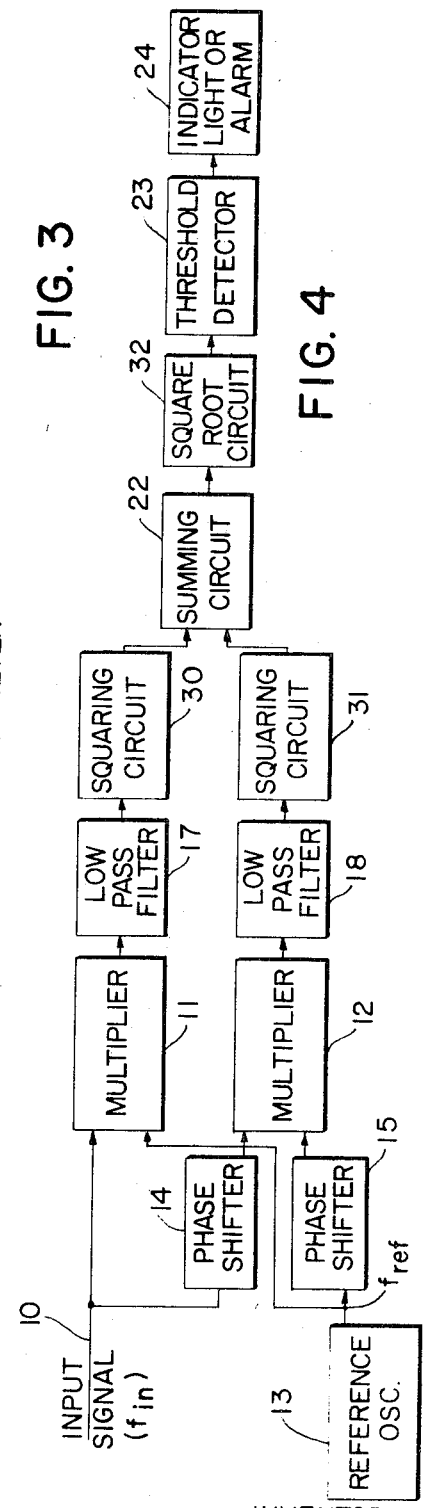
FIG. 4
INVENTORS
ROLAND E. GENTER
RAYMOND S. CONNELL, JR.
BY
Dike, Thompson & Bronstein
ATTORNEYS

RECEIVER FOR DETECTING SIGNALS WITHIN A PREDETERMINED BANDWIDTH

This invention is directed to signal detection devices and is more particularly directed to a pretuned receiver for detecting the presence of a signal lying within a predetermined bandwidth.

The receiver of this invention is ideally suitable for use in conjunction with transmission line communications systems wherein a plurality of remote signalling devices, each emitting different frequencies, are placed on the line at a distance from a central station.

The different signalling devices are used in such communication systems to indicate the occurrence of an event at a predetermined location, (e.g. actuation of a fire alarm). Depending on the frequency of the emitted signal, it is possible to precisely pinpoint from which remote signalling device the signal emanated and to take any necessary action.

Since each signalling device emits a different frequency, low-cost and narrow band-pass receiver means must be provided at a central location in order to detect the presence of the different frequencies present on the line. The cost of the receiver must be comparatively low because a separate receiver is used to detect the signal from each remote signalling device. In addition, in order to utilize the available frequency spectrum to the fullest extent, the bandwidth of each receiver must be sufficiently narrow while at the same time not being prohibitively expensive.

The receiver of this invention must also insure that the presence of a signal on the line will be detected each time a signal from a signalling device is imposed on the line, even in the presence of high noise levels. It should be understood that the receiver of this invention may be used in other communication systems known in the art which do not utilize transmission lines.

In view of the foregoing, it is an object of this invention to provide a new and improved scheme for detecting the presence of a signal.

It is a further object of the invention to provide an economical receiver system for detecting the presence of a signal.

It is another object of the invention to provide a pretuned receiver having narrow bandwidth characteristics.

It is yet another object of this invention to provide a receiver which utilizes low-pass filter means to establish the bandwidth of the receiver.

Still other objects of the invention will in part be obvious and will in part appear hereinafter.

In accordance with this invention, the signal detection device or receiver includes in its broadest aspect, means for multiplying the input signal to be detected by a reference signal and thereafter utilizing low-pass filtering to detect the low-frequency envelope of a signal representing the product of the aforesaid signals. In addition, to insure that the input signal will always be detected, even if the input signal and the reference signal are substantially of the same frequency and/or of a phase such that no, or a small amplitude low-frequency envelope is detectable or present, means is provided for phase shifting the signals (input and reference) relative to each other, and then multiplying and low-pass filtering out the low-frequency envelope of the product of said signals.

For a fuller understanding of the nature and objects of the invention, reference should be had to the following detailed description taken in connection with the accompanying drawings in which:

FIG. 1 is a block diagram illustrating the preferred form of the receiver according to the invention;

FIG. 2 is a diagram illustrating the bandwidth characteristics of the receiver of FIG. 1;

FIG. 3 is a diagram illustrating the low-pass filter characteristic of a portion of the receiver of FIG. 1; and FIG. 4 is a block diagram illustrating an alternate embodiment of a receiver according to the invention.

Reference should now be had to FIGS. 1-3 for a description of the preferred embodiment of the invention.

At 10 there is shown a line for providing signals including an input signal $f_{in}$ (e.g., sinusoidal) to be detected by the receiver of the invention. The input signals may be fed to the receiver's input line 10 in any conventional manner (e.g., from a transformer coupled to an antenna or to a transmission line adapted to provide signals to the receiver). In systems using transmission lines, the signals imposed on the transmission line will normally lie between 100 cycles to 20 kc. which are the frequencies generally used in industrial telemetry systems which utilize audio frequencies for communications.

The incoming sinusoidal and any noise signals including the input sinusoidal signals of a frequency $f_{in}$ which is to be detected are directed to multipliers 11 and 12. The multipliers 11 and 12 used are preferably of the well-known time division multiplier type (see the texts "Electronic Analog Computers," by Korn and Korn, 2nd Edition, (1956) McGraw-Hill Book Co. pages 270–280 and "Electronic Analog Hybrid Computers," by the same authors and publisher, copyrighted 1964, sections 7.9 to 7.12 and others).

It should be understood that other well-known multipliers may also be used although the time division multiplier is preferred for use in the receiver of this invention.

At 13, there is provided a reference oscillator which is preset to provide a signal (e.g., sinusoidal) at a reference frequency $f_{ref}$ which is preferably the same as or is about the same frequency as the input signal to be detected.

As may be seen from FIG. 1, the output from the reference oscillator 13 is directed to multiplier 11. In addition, as may be seen in FIG. 1, the input signal $f_{in}$ and the reference signal $f_r$ are first coupled to phase shifters 14 and 15 before being directed to multiplier 12. The phase shifters 14 and 15 may be of the conventional type, (e.g., capacitive or inductive networks) and are used to provide about a 90° phase difference between the input and reference signals before they are multiplied together in multiplier 12.

To obtain about a 90° phase difference between the two input signals, phase shifter 14 can be used to provide about 90° phase shift and phase shifter 15 can be bypassed (i.e., reference signal is directly coupled to the multiplier 12) or in the alternative phase shifter 15 can be used to provide about 90° of phase shift and phase shifter 15 can be bypassed (i.e., input signal). In the alternative both phase shifters 14 and 15 may be coupled as shown to provide a total of about 90° of phase shift between the input signal and the reference signal.

The reason for the additional multiplier utilized in this system is to insure that the presence of an input signal will always be detected at the output of the low-pass filters shown at 17 and 18. Since we are multiplying two sine waves together in multiplier 11 there is a possibility that if signals are of exactly the same frequency and there is initially about a 90° or 270° phase difference between them, there will be substantially no, or a small output signal at the output of multiplier 12. In order to take into account this possibility, the input signal and/or the reference signal have added to them a preset amount of phase shift so that there is approximately about a 90°±5° phase difference between these signals before they are multiplied together in multiplier 13.

It may be recalled that the product of two sine waves may be represented by the equation, $$[K \sin(\omega_{in}+\phi_1)] [\sin(\omega_{ref}+\phi_2)]$$

equals $$K \cos(\omega_{in}-\omega_{ref}+\phi_1-\phi_2) - (\text{an imaginary product}).$$

Thus unless a redundancy is added to the system, in the case where $\omega_{in}=\omega_{ref}$ and the initial phase difference between $\phi_1$ and $\phi_2$ was 90° or 270°, then the output from low-pass filter 17 (and the system) would be 0. With the additional multiplier 12 and if these events occurred, the about 90° relative phase shift provided would cause a signal K to be present at the output of low-pass filter 18 indicating the presence of an input signal $f_{in}$. Mathematically, the output from the filter 18 is approximately equal to $$K \cos(\omega_{in}-\omega_{ref}+\phi_1-\phi_2\pm 90°)$$

which under the above set of circumstances would be equal to K, where K is a constant.

The outputs, from the multipliers 11 and 12 (products of the input and reference signals) as indicated above are directed to low-pass filters 17 and 18. The low-pass filters 17 and 18 control the bandwidth of the band-pass characteristics of the receiver. The filters are preferably constructed with the filter characteristic shown in FIG. 3 which may be accomplished by using conventional filter design techniques (see reference data for Radio Engineers, 4th Edition, published by IT&T). The low-pass filters 17 and 18 pass the envelope of the products (real part) from multipliers 11 and 12. The detected envelope of the products are then passed through devices 20 and 21 which take the absolute value of the products. Devices 20 and 21 are preferably conventional full-wave rectifiers as shown. The absolute value of the products are then summed in a conventional summing circuit 22, which may be resistive network as shown or could be a more complicated amplifier type of summing circuits such as shown in the aforementioned texts by the authors Korn and Korn. Thereafter the summing circuit 22 provides a signal representing the sum of absolute values of the detected envelopes to a threshold or level detector, such as a Schmitt Trigger 23.

The level or threshold detector turns on when a voltage level appears at its input which is greater than or equal to a predetermined voltage level. The output from the Schmitt Trigger is then utilized to operate a utilization device such as an indicator 24 (e.g., light or an alarm) through relays or other electronic circuitry (not shown) if necessary to indicate that an input signal $f_{in}$ is present and has been detected. The level detector preferably operates such that the sum of both detected outputs (as absolute values) from filters 17 and 18 will have to be greater than the predetermined voltage level for a predetermined period of time to produce an output from the level detector indicating the presence of an input signal. In this manner the detection of extraneous noise on the line is substantially eliminated.

FIG. 2 shows the overall receiver bandwidth characteristics obtained using the low-pass filtering technique of this invention.

As will be seen, one-half bandwidth of the band-pass characteristic is the same as the bandwidth of the low-pass filter characteristic shown in FIG. 3.

In FIG. 4 there is shown another embodiment of the invention which utilizes in part a different technique for obtaining a signal from the low-pass filters to indicate the presence of an input signal. Where applicable in FIG. 4 like numbers have been shown for the same components disclosed and described in conjunction with FIGS. 1-3. At 30 and 31 there are shown squaring circuits for squaring the signals from the low-pass filters (e.g., using conventional multiplier circuits). The squared signals are then summed at 22 and the square root thereof is taken by a conventional square root circuit shown at 32 in order to develop a voltage level indicating the presence of an input signal at a frequency $f_{in}$. The threshold detector 23 is preferably actuated only if the output from the square root circuit is greater than a predetermined magnitude. The remainder of the receiver of FIG. 4 functions as described with reference to FIGS. 1-3. See the aforementioned texts by Korn and Korn for a description of circuitry for taking the square root of a voltage as well as for squaring a voltage.

It will thus be seen that there has been provided an inexpensive receiver construction which develops a signal (voltage level) indicating the presence of an input signal. The aforementioned is broadly accomplished by multiplying together a reference signal and an input signal (both of approximately the same frequency) to develop a low-frequency signal (envelope) which is filtered out utilizing low-pass filtering techniques. Thereafter, a level is obtained which is then detected by determining if the level is greater or equal to a predetermined value (e.g., voltage). If the level is of the proper magnitude, a utilization device such as indicator is activated for indicating that an input signal has been detected. Redundancy is also provided to insure the detection of the input signal in the event that the input signal and the reference signal are related in a particular manner by providing a relative phase shift between the signals and multiplying and low-pass filtering the product of the signals.

It will thus be seen that the objects set forth above, among those made apparent from the preceding description, are efficiently attained and since certain changes may be made in the foregoing constructions and systems without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which as a matter of language be said to fall therebetween.

What is claimed:

1. A receiver for detecting the presence of a sinusoidal input signal within a predetermined bandwidth comprising means for generating a sinusoidal reference signal of approximately the same frequency as the signal to be detected, first multiplier means for multiplying together the input signal and the reference signal, means for phase shifting one or both of said signals such that about a 90° phase difference is provided between said signals, second multiplier means for multiplying together said signals that have been phase shifted relative to each other, first and second low-pass filter means for filtering out a low-frequency envelope indicative of the presence of an input signal at the output of each of said filters, said first filter coupled to the output of said first multiplier and said second filter coupled to the output of said second multiplier, first and second absolute value means for providing output signals representing the absolute value of the output signals from said filters, said first absolute value means coupled to the output of said first filter, and said second absolute value means coupled to the output of said second filter, summing means coupled to the output of said first and second absolute value means for providing a signal representing the sum of the absolute signal values, and level detection means coupled to said summing means for providing an output signal level of a predetermined magnitude if the sum of the absolute signal values is greater than or equal to a predetermined reference value.

2. A receiver according to claim 1 in which the reference signal establishes the center frequency of the receivers' band-pass characteristic and wherein the bandwidth of the receiver is approximately equal to twice the low-pass filter bandwidth.

3. A receiver according to claim 2 in which an indicator is coupled to the level detection means to indicate the presence of an input signal.

4. A receiver according to claim 1 in which each of the absolute value means comprises a full-wave rectifier.

5. A receiver for detecting the presence of a sinusoidal input signal within a predetermined bandwidth comprising means for generating a sinusoidal reference signal of approximately the same frequency as the signal to be detected, first multiplier means for multiplying together the input signal and the reference signal, means for phase shifting one or both of said signals such that about a 90° phase difference is provided between said signals, second multiplier means for multiplying together said signals that have been phase shifted relative to each other, first and second low-pass filter means for filtering out a low-frequency envelope indicative of the presence of an input signal at the output of each of said filters, said first filter coupled to the output of said first multiplier and said second filter coupled to the output of said second multiplier, first squaring means coupled to the output of said first filter for squaring the output signal from said first filter, second squaring means coupled to the output of said second filter for squaring the output signal from said second filter, summing means coupled to the output of said first and second squaring means, and detection means for generating a predetermined output signal level depending upon the magnitude of the signal provided by said summing means.

6. A system according to claim 5 in which the detection means includes means coupled to the summing means for taking the square root of the signal provided at the output of the summing means.

7. A system according to claim 6 in which the detection means includes level detector means for indicating if the output from the means for taking the square root is greater than or equal to a predetermined level.

8. A system according to claim 7 in which the detection means includes utilization means responsive to a signal provided by said level detector means.

9. A method of detecting the presence of an input signal of a predetermined frequency which comprises the steps of (a) multiplying together a reference signal of the same frequency as the input signal to be detected with the input signal, (b) phase shifting the input signal and said reference signal relative to each other to provide about a 90° degree phase difference between the signals, (c) multiplying together the input and said reference signals after they have been phase shifted with respect to each other, (d) low-pass filtering the products of both multiplication steps, and (e) generating a steady DC voltage level if the sum of the products of the signals provided after low-pass filtering is equal to or greater than a predetermined threshold voltage.

* * * * *